Jan. 15, 1957   R. J. BRANT   2,777,219
TRENCHING MACHINE
Filed April 24, 1953   4 Sheets-Sheet 1

INVENTOR.
ROBERT J. BRANT,
BY
McMorrow, Berman + Davidson
ATTORNEYS.

Jan. 15, 1957
R. J. BRANT
2,777,219
TRENCHING MACHINE
Filed April 24, 1953
4 Sheets-Sheet 3
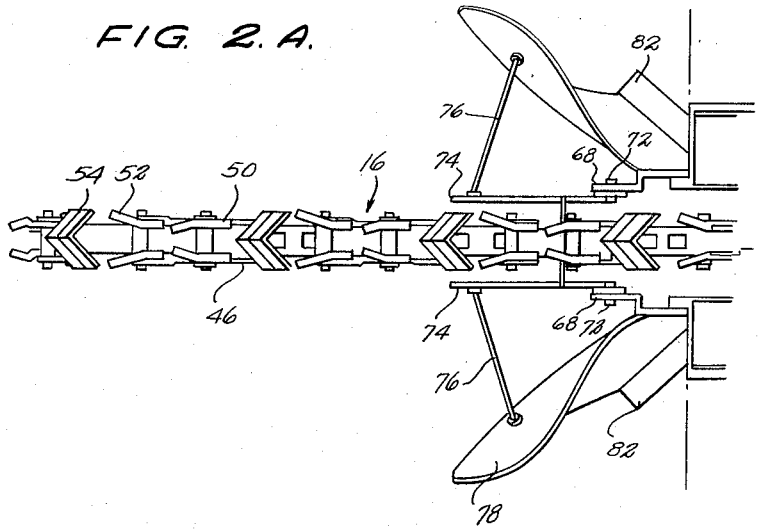
FIG. 2.A.
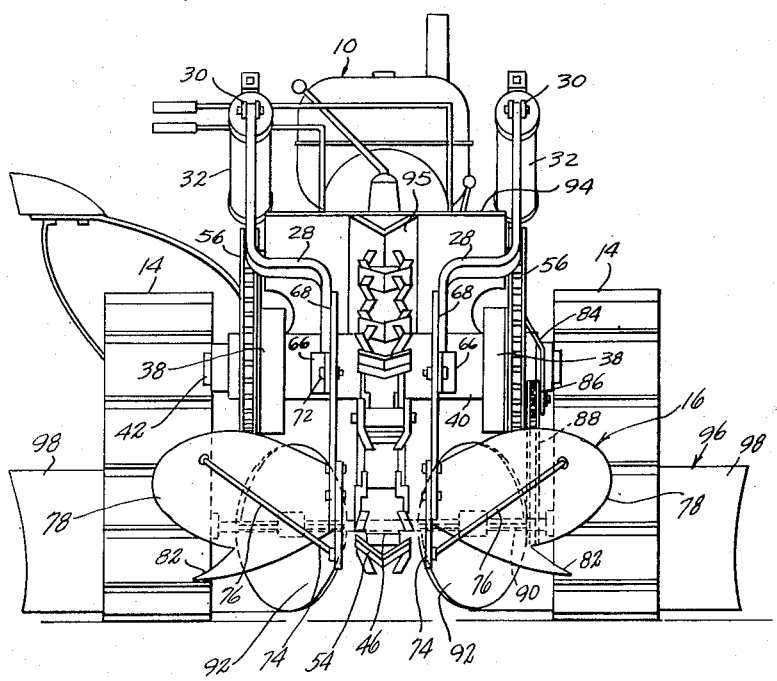
FIG. 3.
INVENTOR.
ROBERT J. BRANT,
BY
McMorrow, Berman & Davidson
ATTORNEYS.

Jan. 15, 1957     R. J. BRANT     2,777,219
TRENCHING MACHINE

Filed April 24, 1953     4 Sheets-Sheet 4

INVENTOR.
ROBERT J. BRANT,
BY

McMorrow, Berman + Davidson
ATTORNEYS.

United States Patent Office 2,777,219
Patented Jan. 15, 1957

2,777,219
TRENCHING MACHINE
Robert J. Brant, San Rafael, Calif.
Application April 24, 1953, Serial No. 350,911
5 Claims. (Cl. 37—86)

This invention relates to a trenching machine, and more particularly, has reference to a machine of the character stated which is adapted to be mounted upon a tractor or similar traction vehicle.

The present invention, summarized briefly, comprises a trenching machine which includes an endless chain adapted to be driven at a high speed from the traction vehicle. The direction in which the chain is driven is such as to cause the lower flight of the chain to move forwardly toward said vehicle. The chain is provided, throughout its length, with specially designed raking and cutting teeth which, on high speed movement of the chain in the manner referred to, will dig into the ground surface and will, by reason of the high speed operation, forcibly throw the excavated material against an upstanding deflector shield mounted forwardly of the chain. The deflector shield has a rearwardly curving top portion, so disposed as to change the direction of movement of the thrown material, thereby to deflect said material rearwardly. The deflector shield, in this connection, has a divider medially between opposite side edges thereof, and said divider, cooperating with the curved formation of the shield, separates the material so as to cause the material to be directed rearwardly to opposite sides of the chain. Side deflector plates diverge rearwardly of the chain, and are in the path of the material deflected by the shield, thus to cause said material to be banked along opposite sides of a trench formed by the machine.

The trenching machine, summarized further, includes a pair of adjustable blades adapted to be mounted at the front end of the traction vehicle, said blades being adjustable between selected positions in one of which they are coplanar and are disposed normally to the path of movement of the traction vehicle, thus to clear and level the surface in advance of the chain. In the other position of said blades, they are extended in diverging relation, and will fill a previously dug trench when the tractor or other traction vehicle is put in reverse.

Heretofore, trenching machines have not, generally speaking, been adapted for mounting on conventional tractors, and one important object of the present invention is to provide a novelly designed trenching machine that will be particularly adapted for installation on tractors of conventional design.

Another object is to provide a trenching machine, which, by reason of its adaptability for installation on a tractor, can be used for much heavier work than trenching machines now in use, which, in many instances, are mounted upon light trucks or the like.

A further important object of the invention is to provide trenching apparatus as stated wherein rotatable discs will be associated with the digging chain, in such a manner as to cooperate with the deflector shield and side deflector plates in throwing excavated material laterally toward opposite sides of the ditch or trench dug by the chain.

Still another object of importance is to provide a trenching machine wherein the digging chain will be mounted upon a pivoted boom, said boom pivoting in a vertical plane and being adjustable by a suitable hydraulic means to selected positions relative to the ground surface, thereby to provide a depth adjustment assembly in the machine.

Yet another object is to provide trenching apparatus as described in which drive means associated with the chain will be so designed as to make use, for the most part, of conventional drive elements, such as a three-speed vehicle transmission, and a vehicle differential of well known design.

Other objects will appear from the following description, the claims appended thereto, and from the annexed drawings, in which like references designate like parts throughout the several views, and wherein:

Figure 1 and Figure 1a are a side elevational view of a trenching machine formed in accordance with the present invention as it appears when mounted upon a tractor;

Figure 2a is a top plan view of the structure shown in Figure 1a.

Figure 3 is a rear elevational view of the structure shown in Figure 1 with the structure shown in Figure 1a attached thereto.

Figure 1:
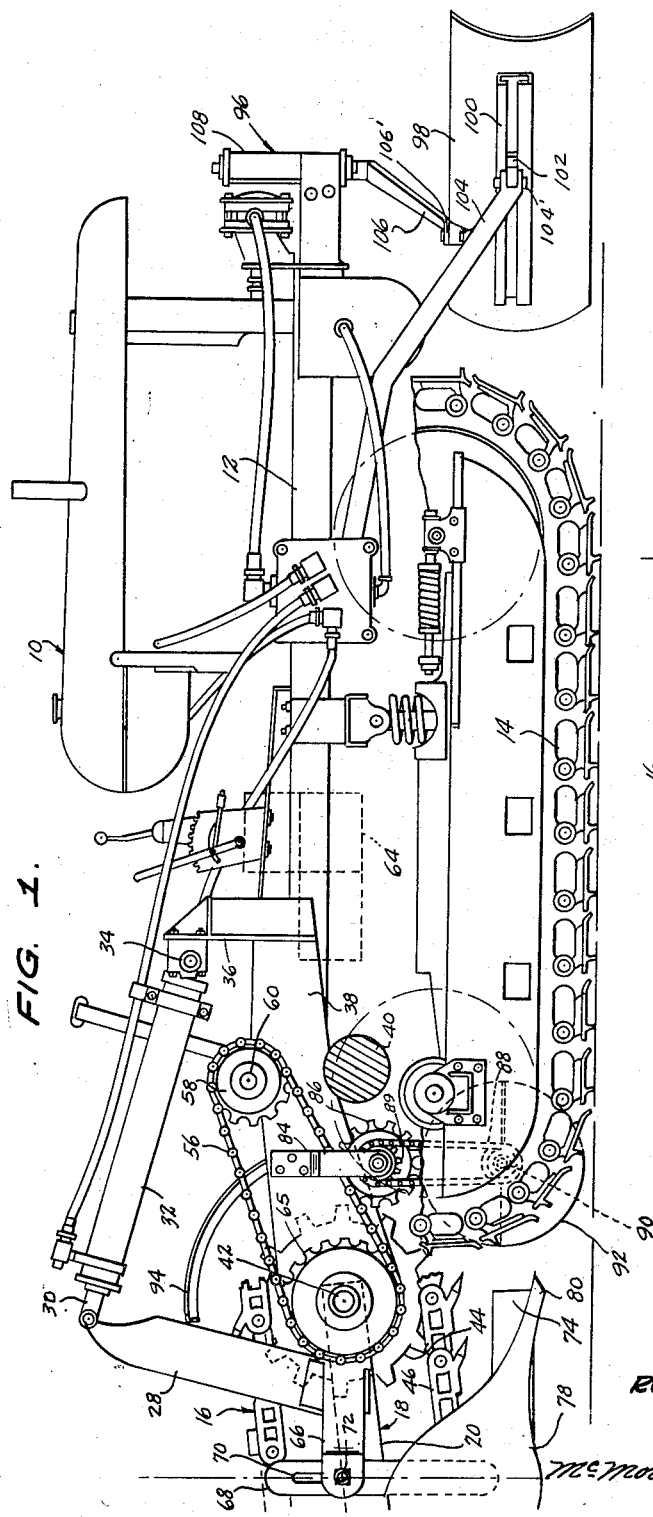

Referring to the drawings in detail, the reference numeral 10 has been applied generally to a tractor of conventional design, said tractor having longitudinally extended, parallel side frame members 12 and endless treads 14.

Figure 5:
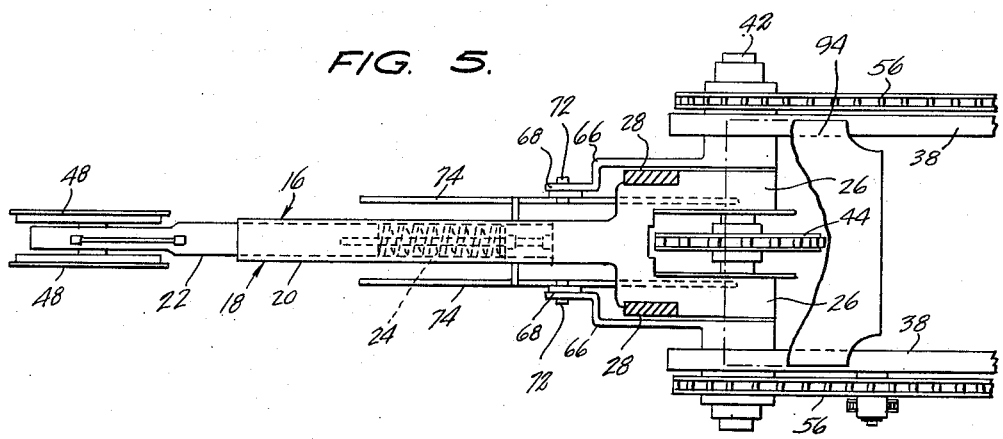
Figure 5 is a top plan view in which parts are broken away and other parts are shown in section, of the telescoping boom used as a support for the digging chain, the chain being removed.

The trenching machine constituting the present invention has been designated generally at 16, and includes a boom 18 shown to particular advantage in Figure 5.

The boom 18 is of elongated formation, and is adapted to extend rearwardly from the tractor 10. The boom is of the telescoping type, and hence includes a boom sleeve 20 in which is slidable a boom shaft 22. A spring 24 disposed within the boom sleeve 20 exerts continuous pressure against the inner end of the boom shaft, tending to urge the boom shaft 22 outwardly from its associated sleeve. In this way, tension on the chain carried by the boom, which chain will be described hereinafter, is continuously maintained.

At its inner end, the boom sleeve 20 is formed with parallel fork arms 26 (Figure 5), and rigidly secured at their lower ends to the respective fork arms are upwardly extending connecting arms 28. The arms 28, as best shown in Figure 3, have outwardly and laterally offset upper end portions, said upper end portions being pivotally connected, at the upper ends of the connecting arms, to pistons 30 that project rearwardly from hydraulic cylinders 32. The hydraulic cylinders 32, at their front ends, are pivotally connected at 34 to upstanding brackets 36 secured fixedly to the respective side frame members 12 of the tractor.

Also secured fixedly to the respective side frame members 12 are boom support bars 38. A pair of said bars is employed in accordance with the present invention, the bars of said pair being extended in parallel relation along their associated side frame members 12, with the rear ends of the bars 38 projecting beyond the rear ends of the side frame members.

To rigidify and strengthen the boom support defined by bars 38, I utilize a cross bar 40 mounted upon the tractor chassis and extending transversely between the respective bars 38, said cross bar being fixedly connected at its opposite ends to said bars.

Carried by the rearwardly projecting ends of the bars 38, and extending transversely therebetween, is a chain drive shaft 42, said shaft 42 being journaled for rotation in suitable bearings carried by bars 38. A chain drive sprocket 44 is keyed or otherwise secured to the shaft 42, medially between the respective boom support bars 38, and is disposed in the space between the fork arms 26, as best shown in Figure 5. The shaft 42, in this connection, passes through suitable openings formed in the fork arms 26, and thus, the boom 18 is pivotally mounted upon the boom support arms 38, for swinging movement in a vertical plane, the rear end of the boom being swingable in an arcuate path about the pivot axis of the boom defined by shaft 42.

Trained about the sprocket 44 is a digging chain 46, said chain extending longitudinally of the boom and being trained, at its rear end, about idlers 48 carried by the boom shaft 22.

The formation of the chain is of particular importance, and as will be noted from Figure 2a, the chain has, throughout its length, digging elements 50, 52, 54. The elements are so formed as to dig into the ground surface on high speed movement of the chain, and it is important to note that said elements include cutting teeth 50, 52, and raking teeth 54. The cutting teeth 50 are disposed in pairs, with the teeth of each pair being aligned transversely of the chain, and converging toward the rear of the chain. The cutting teeth 52 are also disposed in pairs, with the teeth of each pair diverging rearwardly of the chain. The raking teeth 54 are of V-shaped formation, and are disposed transversely of the chain. Referring now to Figure 1a, it is seen that the teeth 50, 52 are so disposed as to be inclined downwardly and forwardly toward the front end of the chain, when said teeth are disposed on the lower flight of the chain.

The chain will be rotated at high speed, in such a direction as to cause the lower flight of the chain to travel in the path of movement of the tractor 10, that is, toward the front end of the chain. Due to the fact that the teeth on the lower flight are inclined downwardly and forwardly toward said front end of the chain, said teeth 50, 52 will dig into the ground surface, and will throw the excavated material forcibly toward and beyond the front end of the chain. The raking teeth 54 serve the function of cleaning the grooves dug by the digging teeth.

The chain is driven from the tractor 10, and accordingly, drive chains 56 are disposed at opposite sides of the tractor, said drive chains being trained about sprockets 58 secured to a differential shaft 60. The shaft 60 extends from a conventional differential 62, drive being transmitted to the differential from the motor of the tractor, through a conventional three-speed transmission 64.

The chains 56 are adapted to drive sprockets 65 secured to opposite ends of the shaft 42, adjacent the boom support bars 38, and in this manner, high speed rotation is transmitted to the digging chain.

Secured fixedly to the fork arms 26, so as to pivot with the boom about the axis defined by shaft 42, are side deflector plate support arms 66, said arms being disposed horizontally and being connected, at their rearwardly projected ends (Figure 1) to vertically disposed hanger arms 68.

In each arm 68 there is formed a slot 70, through which extends bolts 72, the bolts 72 projecting from the arms 66. In this way, the hanger arms 68 are connected to the arms 66, and are adjustable vertically to selected positions relative to said arms 66.

Secured fixedly to the lower ends of the hanger arms 68 are horizontally disposed plate support bars 74 (Figure 1a). Support rods 76 are connected at their inner ends to the bars 74, and project laterally and upwardly from opposite sides of the chain assembly, as shown in Figure 3.

Carried by the rods 76 and bars 74 are side deflector plates 78. The plates 78, when considered in top plan, diverge rearwardly of the chain assembly, at opposite sides of the chain assembly, as best shown in Figure 2a. Further, the plates are transversely curved, so as to have overhanging top edge portions adapted to guide excavated material longitudinally of the side deflector plates, for passage beyond the rear ends of said plates.

Further, the plates 78, along their lower edges, are formed with laterally extended projections 82, that cooperate with the overhanging top edge portions in channeling the excavated material along the desired path.

The front or leading ends of the side deflector plates are, as shown in Figure 1, tapered so as to form narrower front ends 80 on the plates, this formation facilitating the movement of the plates along the ground surface.

Immediately in front of the respective deflector plates, I provide rotatable, pitched dish-shaped discs, the purpose of which is to push excavated material rearwardly toward the deflector plates, which plates will then deposit said material along opposite sides of the trench. The discs are powered from the traction vehicle, and accordingly, brackets 84 are secured to the respective boom support bars (Figure 1), said brackets depending from the bars 38 and carrying sprockets 86. Chains 88 are trained about smaller sprockets 89 that are rotatable with and by the sprockets 86, the chains 88 being then trained about sprockets carried by opposite ends of a disc shaft 90 extending transversely of the tractor and journaled at its opposite ends in the tractor frame.

The sprockets 86 are in mesh with the chains 56, and accordingly, when the chains 56 are driven from the tractor motor, the sprockets 86 will be rotated, thus to rotate the dish-shaped discs 92 in a clockwise direction. Discs 92 are arranged in pairs disposed at opposite sides of the digging chain, the discs of each pair being diametrically opposed.

A main deflector shield 94 is mounted upon and between the respective boom support bars 38, said main deflector shield extending upwardly in front of the leading end of the digging chain, and having a rearwardly curved top portion concentric with the pivot axis of the boom.

The excavated material thrown forcibly in front of the chain by the trenching elements of the chain will be thrown against the main deflector shield 94, and, due to the curved formation of said shield 94, said material will be deflected rearwardly. As shown by Figure 3, the deflector shield is provided with a divider 95 of V-shaped cross sectional formation, said divider 95 being disposed medially between opposite side edges of the deflector shield. Thus, when the excavated material is thrown against the deflector shield by the trenching elements, it will be separated by the divider 95, and will be deflected rearwardly, in twin streams, along opposite sides of the digging chain. The deflector plates 78 at opposite sides of the chain are disposed in the path of the rearwardly deflected material, and as a result, said material will be deflected outwardly and laterally from opposite sides of the digging chain, by reason of the rearwardly diverging arrangement of the side deflector plates. The excavated material will thus be banked along opposite sides of the ditch or trench.

The rotatable discs 92, it should be noted, aid in directing the excavated material deflected by shield 94, to the side deflector plates.

The trenching equipment described above is particulaly adapted for use in association with a combined surface leveling and trench filling assembly designated generally by the reference numeral 96, and mounted upon the front end of the tractor 10. The assembly 96 includes a pair of blades 98, said blades having horizontally disposed channels 100 on their back surfaces, in which channel blocks 102 are slidable. The blocks 102 are pivotally connected at 104' to the leading ends of blade support arms 104, the arms 104 being slidably mounted upon opposite sides of the tractor. Thus, if it is desired to swing the blades into a position in which the blades are coplanar and are disposed normally to the longitudinal center line of the tractor, it is merely necessary that the arms 104 be adjusted rearwardly by suitable means along opposite sides of the tractor, this having the effect of swinging the inner ends of the blades forwardly into engagement with one another. In this way, the effect of a solid, one-piece blade is obtained. It should be noted, in this regard, that the blades 98 would generally be swung into a coplanar arrangement as indicated when the tractor 10 is moving forwardly and a trench is being dug. The blades will, on these occasions, clear and level the ground surface in advance of the digging chain.

Figure 2:
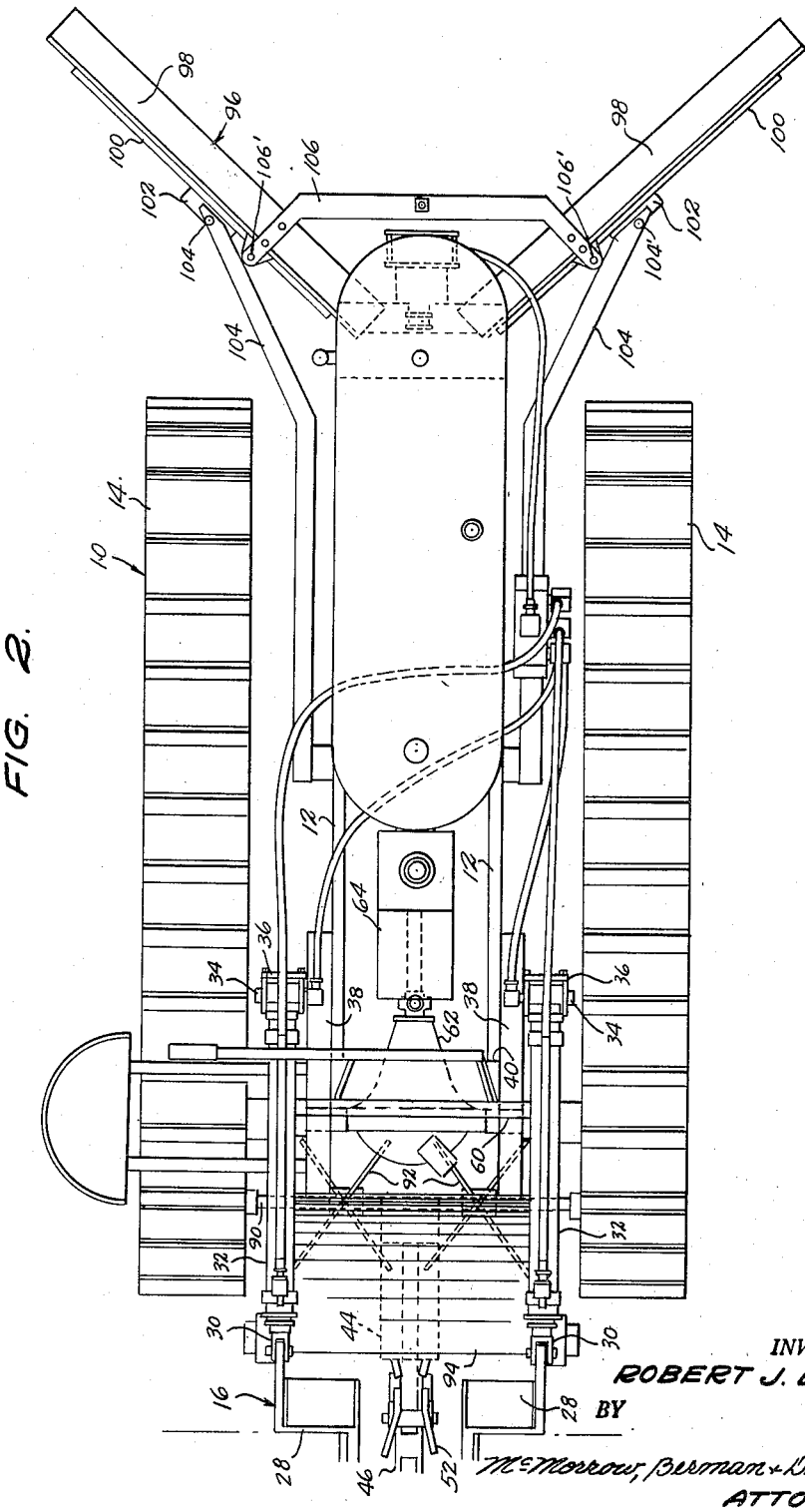
Figure 2 is a top plan view of the structure shown in Figure 1.
Figure 4:
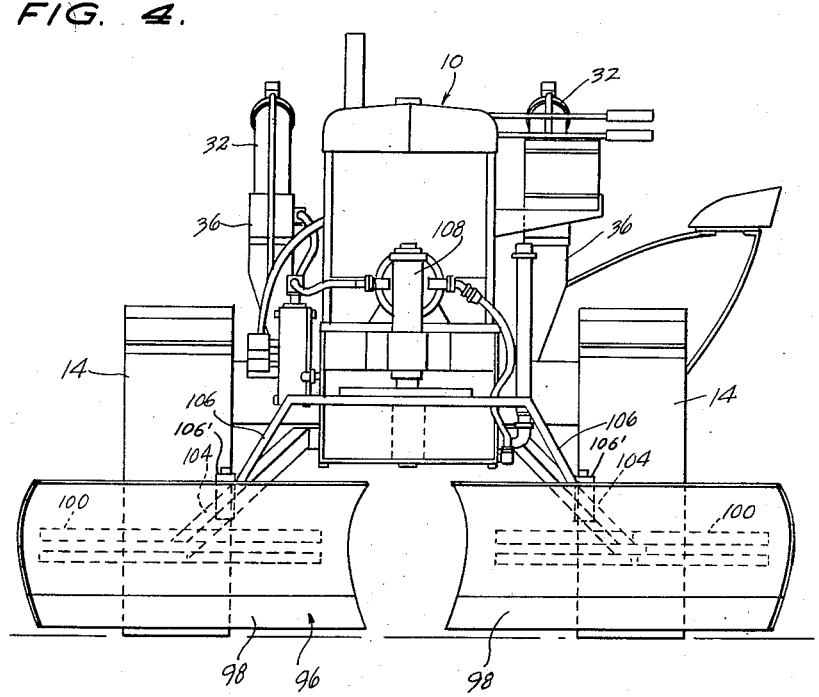
Figure 4 is a front elevational view of the structure shown in Figure 1.

The blades 98 would be adjusted to a position in which they converge rearwardly of the tractor, this position being shown in Figure 2, whenever said blades are to be used in filling a previously excavated trench. When the blades are adjusted to the position shown in Figure 2, they are adapted to push the mounds of previously excavated material extending along opposite sides of the trench inwardly, into the trench, thus to refill the trench.

The blades 98 can be adjusted bodily upwardly or downwardly, to inoperative and operative positions respectively. To this end, a cross bar 106 is pivotally connected at 106' to the backs of the respective blades 98, said cross bar 106 being extended transversely of and in front of the tractor 10, and being adjustable upwardly or downwardly by means of a hydraulic ram 108.

I believe that it will be apparent that a trenching apparatus formed in accordance with the present invention can be mounted in association with a conventionally designed tractor, the tractor illustrated in the drawings by way of example being representative of one type of tractor with which my trenching machine can be effectively used.

It is also thought important to note that the entire apparatus can be controlled from the operator's seat of the tractor, the necessary adjustments of the boom for elevation, and the necessary operation of the hydraulic means used during operation of the equipment, being easily made.

It is also thought to be an important characteristic of the invention that the entire assembly can be driven from the power takeoff of the tractor, with the chain being driven at high speed through the medium of a conventional, three-speed vehicle transmission. The chain, in this regard, is so formed as to cut into the ground in a mode of operation that will break the excavated material into small particles, which small particles will be thrown upwardly with great force against the deflector shield. The particular formation and relative arrangement of the deflector shield and side plates is of importance in this regard, since they have the effect of first dividing the forcibly thrown material into twin streams, and then deflecting said streams rearwardly and laterally, away from the trench.

It is believed apparent that the invention is not necessarily confined to the specific use or uses thereof described above, since it may be utilized for any purpose to which it may be suited. Nor is the invention to be necessarily limited to the specific construction illustrated and described above, since such construction is only intended to be illustrative of the principles of operation and the means presently devised to carry out said principles, it being considered that the invention comprehends any minor change in construction that may be permitted within the scope of the appended claims.

What is claimed is:

1. In a trenching machine, a vehicle including a supporting framework, an endless digging chain extending longitudinally of the vehicle at the rear end thereof, said chain including a lower flight which has a leading end extending into said framework, said chain being pivoted at its leading end upon the framework for swinging movement in a generally vertical plane, the leading end of said lower flight being elevated above the ground surface and the trailing end thereof being in engagement with the ground in trench digging position to excavate material responsive to driving of the chain, chain driving means mounted on said framework including a shaft common to the pivot axis of the chain and rotating in a direction to drive the lower bight in the direction of its leading end, said chain including digging elements adapted to throw material excavated by the chain upwardly and in front of said leading end, a deflector shield fixedly mounted on the framework above the chain at the leading end thereof in the path of the thrown material and having a top portion curved rearwardly about a center common to said pivot axis to turn the deflected material rearwardly along the chain above the same, said shield including a divider arranged for forming the material into twin streams gravitating along opposite sides of the chain during the rearward movement of said material, and downwardly divergent side deflector plates supported from the framework for swinging movement with the chain about said pivot axis and located at opposite sides of the chain in the path of said streams of gravitating material in positions such that the material will strike the plates for deflection thereby before reaching the ground surface to bank the material along opposite sides of the trench excavated by the chain.

2. In a trenching machine, a vehicle including a supporting framework, an endless digging chain extending longitudinally of the vehicle at the rear end thereof, said chain including a lower flight which has a leading end extending into said framework, said chain being pivoted at its leading end upon the framework for swinging movement in a generally vertical plane, the leading end of said lower flight being elevated above the ground surface and the trailing end thereof being in engagement with the ground in trench digging position to excavate material responsive to driving of the chain, chain driving means mounted on said framework including a shaft common to the pivot axis of the chain and rotating in a direction to drive the lower bight in the direction of its leading end, said chain including digging elements adapted to throw material excavated by the chain upwardly and in front of said leading end, a deflector shield fixedly mounted on the framework above the chain at the leading end thereof in the path of the thrown material and having a top portion curved rearwardly about a center common to said pivot axis to turn the deflected material rearwardly along the chain above the same, said shield including a divider arranged for forming the material into twin streams gravitating along opposite sides of the chain during the rearward movement of said material, downwardly divergent side deflector plates supported from the framework for swinging movement with the chain about said pivot axis and located at opposite sides of the chain in the path of said streams of gravitating material in positions such that the material will strike the plates for deflection thereby before reaching the ground surface to bank the material along opposite sides of the trench excavated by the chain, said side deflector plates further diverging in their rearward direction to provide surfaces obliquely disposed relative to the path of the rearwardly moving streams of material.

3. In a trenching machine, a vehicle including a supporting framework, an endless digging chain extending longitudinally of the vehicle at the rear end thereof, said chain including a lower flight which has a leading end extending into said framework, said chain being pivoted at its leading end upon the framework for swinging movement in a generally vertical plane, the leading end of said lower flight being elevated above the ground surface and the trailing end thereof being in engagement with the ground in trench digging position to excavate material responsive to the driving of the chain, chain driving means mounted on said framework including a shaft common to the pivot axis of the chain and rotating in a direction to drive the lower flight in the direction of its leading end, said chain including digging elements adapted to throw material excavated by the chain upwardly and in front of said leading end, a deflector shield fixedly mounted on the framework above the chain at the leading end thereof in the path of the thrown material and having a top portion curved rearwardly about a center common to said pivot axis to turn the deflected material rearwardly along the chain above the same, said shield including a divider arranged for forming the material into twin streams gravitating along opposite sides of the chain during the rearward movement of said material, and downwardly divergent side deflector plates supported from the framework for swinging movement with the chain about said pivot axis and located at opposite sides of the chain in the path of said streams of gravitating material in positions such that the material will strike the plates for deflection thereby before reaching the ground surface to bank the material along opposite sides of the trench excavated by the chain, said side deflector plates further diverging in their rearward direction to provide surfaces obliquely disposed relative to the path of the rearwardly moving streams of material, said side deflector plates being transversely curved and being formed with overhanging top portions operative to guide the rearwardly moving material longitudinally of the side deflector plates between the top and bottom edges of said plates for passage beyond the trailing ends of the plates.

4. In a trenching machine, a vehicle including a supporting framework, an endless digging chain extending longitudinally of the vehicle at the rear end thereof, said chain including a lower flight which has a leading end extending into said framework, said chain being pivoted at its leading end upon the framework for swinging movement in a generally vertical plane, the leading end of said lower flight being elevated above the ground surface and the trailing end thereof being in engagement with the ground in trench digging position to excavate material responsive to driving of the chain, chain driving means mounted on said framework including a shaft common to the pivot axis of the chain and rotating in a direction to drive the lower flight in the direction of its leading end, said chain including digging elements adapted to throw material excavated by the chain upwardly and in front of said leading end, a deflector shield fixedly mounted on the framework above the chain at the leading end thereof in the path of the thrown material and having a top portion curved rearwardly about a center common to said pivot axis to turn the deflected material rearwardly along the chain above the same, said shield including a divider arranged for forming the material into twin streams gravitating along opposite sides of the chain during the rearward movement of said material, and downwardly divergent side deflector plates supported from the framework for swinging movement with the chain about said pivot axis and located at opposite sides of the chain in the path of said streams of gravitating material in positions such that the material will strike the plates for deflection thereby before reaching the ground surface to bank the material along opposite sides of the trench excavated by the chain, said side deflector plates further diverging in their rearward direction to provide surfaces obliquely disposed relative to the path of the rearwardly moving streams of material, said side deflector plates being transversely curved and being formed with overhanging top portions operative to guide the rearwardly moving material longitudinally of the side deflector plates between the top and bottom edges of said plates for passage beyond the trailing ends of the plates, said side deflector plates being formed with laterally extending projections cooperating with the overhanging top edge portions in channeling the excavated material longitudinally of the side deflector plates.

5. In a trenching machine, a vehicle including a supporting framework, an endless digging chain extending longitudinally of the vehicle at the rear end thereof, said chain including a lower flight which has a leading end extending into said framework, said chain being pivoted at its leading end upon the framework for swinging movement in a generally vertical plane, the leading end of said lower flight being elevated above the ground surface and the trailing end thereof being in engagement with the ground in trench digging position to excavate material responsive to driving of the chain, chain driving means mounted on said framework including a shaft common to the pivot axis of the chain and rotating in a direction to drive the lower flight in the direction of its leading end, said chain including digging elements adapted to throw material excavated by the chain upwardly and in front of said leading end, a deflector shield fixedly mounted on the framework above the chain at the leading end thereof in the path of the thrown material and having a top portion curved rearwardly about a center common to said pivot axis to turn the deflected material rearwardly along the chain above the same, said shield including a divider arranged for forming the material into twin streams gravitating along opposite sides of the chain during the rearward movement of said material, downwardly divergent side deflector plates supported from the framework for swinging movement with the chain about said pivot axis and located at opposite sides of the chain in the path of said streams of gravitating material in positions such that the material will strike the plates for deflection thereby before reaching the ground surface to bank the material along opposite sides of the trench excavated by the chain, and pairs of pushing discs rotatably mounted upon said framework, one pair at each side of said chain forwardly of the deflector plate disposed at the same side of the chain, the discs of each pair being of dish-shape and being in diametrically opposed relation, the discs of each pair being pitched obliquely to one another and to the axis of rotation of the discs in positions to push excavated material rearwardly toward the deflector plates, said driving means having a driving connection with the discs for rotating the same.

References Cited in the file of this patent

UNITED STATES PATENTS

| Number | Name | Date |
|---|---|---|
| 167,805 | Taylor | Sept. 14, 1875 |
| 234,352 | Veil | Nov. 9, 1880 |
| 351,701 | Humphreys | Oct. 26, 1886 |
| 1,108,268 | Stahl | Aug. 25, 1914 |
| 1,538,565 | Loken | May 19, 1925 |
| 1,767,017 | Scheckler | June 24, 1930 |
| 2,140,105 | Cluster | Dec. 13, 1938 |
| 2,169,184 | French | Aug. 8, 1939 |
| 2,519,076 | Schmidt | Aug. 15, 1950 |
| 2,519,077 | Schmidt | Aug. 15, 1950 |
| 2,594,990 | Protzeller | Apr. 29, 1952 |
| 2,684,542 | Larson et al. | July 27, 1954 |

FOREIGN PATENTS

| Number | Country | Date |
|---|---|---|
| 591,337 | Great Britain | Aug. 14, 1947 |